United States Patent
Song et al.

(10) Patent No.: US 9,819,695 B2
(45) Date of Patent: Nov. 14, 2017

(54) SCANNING METHOD AND DEVICE, AND CLIENT APPARATUS

(71) Applicant: TENCENT TECHNOLOGY (SHENZHEN) COMPANY LIMITED, Guangdong (CN)

(72) Inventors: Aiyuan Song, Guangdong (CN); Ling Guo, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 87 days.

(21) Appl. No.: 14/581,014

(22) Filed: Dec. 23, 2014

(65) Prior Publication Data

US 2015/0113653 A1 Apr. 23, 2015

Related U.S. Application Data (63) Continuation of application No. PCT/CN2013/077799, filed on Jun. 24, 2013.

(30) Foreign Application Priority Data

Jun. 26, 2012 (CN) .......................... 2012 1 0213332

(51) Int. Cl.
*G06F 21/00* (2013.01)
*G06F 12/14* (2006.01)
(Continued)

(52) U.S. Cl.
CPC ............ *H04L 63/145* (2013.01); *G06F 21/56* (2013.01)

(58) Field of Classification Search
CPC .................................................... H04L 63/145
(Continued)

(56) References Cited

U.S. PATENT DOCUMENTS 6,968,461 B1 11/2005 Lucas et al.
7,496,960 B1 2/2009 Chen et al.
(Continued)

FOREIGN PATENT DOCUMENTS

| CN | 102012992 | 4/2011 |
|----|-----------|--------|
| CN | 102194073 | 9/2011 |
| CN | 102799811 | 11/2012 |

OTHER PUBLICATIONS

International Search Report for PCT/CN2013/077799 dated Sep. 26, 2013.

(Continued)

*Primary Examiner* — Alexander Lagor
(74) *Attorney, Agent, or Firm* — Anova Law Group, PLLC (57) ABSTRACT

Disclosed are a scanning method and device, and a client apparatus. The method comprises: when a specified scanning is started, enumerating at least one disk file in an area corresponding to the specified scanning; determining, according to the at least one disk file and at least one suspicious file obtained in a real-time protection process, a file scanning queue; and scanning the determined file scanning queue according to a virus scanning engine. The present invention redetermines a file scanning queue according to the suspicious file obtained in advance from the real-time protection process, so that the possible threats are scanned throughout, thus thoroughly removing the threats. With scanning method according to the present embodiment, the files can be thoroughly scanned, thus improving the capability of removing the threats and the efficiency of searching and removing the viruses, as compared with the prior art.

17 Claims, 3 Drawing Sheets

(51) Int. Cl.
　　　*G06F 11/00*　　　(2006.01)
　　　*H04L 29/06*　　　(2006.01)
　　　*G06F 21/56*　　　(2013.01)

(58) Field of Classification Search
　　　USPC .................................................. 726/22–25
　　　See application file for complete search history.

(56) References Cited

U.S. PATENT DOCUMENTS

| 7,681,237 | B1 | 3/2010 | Spiegel et al. | |
| 2003/0046611 | A1* | 3/2003 | Muttik | H04L 63/145 |
| | | | | 714/38.14 |
| 2010/0154056 | A1* | 6/2010 | Smith | G06F 21/564 |
| | | | | 726/22 |
| 2014/0157408 | A1* | 6/2014 | Mei | G06F 21/55 |
| | | | | 726/22 |

OTHER PUBLICATIONS

Office Action dated Jul. 1, 2013 issued in Chinese Application No. 201210213332.9 with concise explanation in English (7 pages).

* cited by examiner

SCANNING METHOD AND DEVICE, AND CLIENT APPARATUS

This application is a continuation application of PCT Patent Application No. PCT/CN2013/077799, entitled "Scanning Method and Device, and Client Apparatus" filed on Jun. 24, 2013, which claims priority to Chinese Patent Application No. 201210213332.9, entitled "Scanning Method and Device" filed on Jun. 26, 2012, both of which are incorporated by reference in their entirety.

FIELD OF THE INVENTION

The present invention relates to the field of computer securities, in particular to a scanning method and device, and a client apparatus.

BACKGROUND

A computer virus refers to a set of self-reproduceable computer instructions or program codes, which can be implanted in computer programs by a programmer to destroy computer functions or corrupt data so as to affect the use of the computer.

With popularization of computer applications and rapid development of the Internet, computer viruses are spreading at a surprisingly high speed. To protect computer resources against the computer viruses, a security software is provided in the prior art. The security software is a program tool, which can remove almost all known program codes with damages to computers, such as a virus, a Trojan.

A main task of the security software is to implement real-time protection and file scanning.

The real-time protection generally refers to an operation mode in which the system execution process is synchronously monitored by the security software, for example, an antivirus software monitors a memory of the computer and calls system files. That is, when the security software performs the real-time protection, an application program of the security software will scan an object before it is accessed, in order to find some potential virus; and if the virus is found in the object, the application program will remove the infected object or prevent the infected object from being accessed.

The file scanning generally refers to anther operation mode in which files in a disk or a memory of the computer system are checked by the security software to decide whether the files in the disk or the memory conforms to a security standard of the security software based on the determination of the security software.

In implementing the invention, an inventor found that there are at least following problems in the prior art.

The real-time protection and the file scanning provided by the security software are operated independently from each other, that is, the security task conducted by the real-time protection mode has no interaction with that conducted by the file scanning mode. This may be convenient for the management and application of the security software, some viruses, however, are likely to be ignored. For example, presently there is a type of maternal virus, which itself may have or do not have a damage capability but can release a subprogram or a sub-file and put the subprogram or the sub-file into a file directory which seems to be irrelevant to the maternal virus or into a random file directory, and the subprogram or the sub-file released by the maternal virus has a damage behavior such as a damage to the computer or embezzlement of user information. It is very difficult for the existing security software to thoroughly remove such virus, that is, only the subprogram or the sub-file released by the maternal virus can be removed, but the maternal virus located at somewhere of the computer cannot be searched out and effectively removed, so that a user will meet the following cases when using the security software: (1) after a threat is founded and removed by the real-time protection, the threat may be found yet again; (2) after a threat is found and removed by the file scanning, the threat may be found yet again; (3) after a threat is found and removed by the file scanning, a similar threat may be found yet again; and (4) after a threat is intercepted and removed by the real-time protection, the threat may also be scanned by the file scanning. With the existing file scanning, a virus within the computer system cannot be thoroughly removed, thereby seriously affecting the capability of removing the threats, so that the process for searching and removing the virus scanning has a low efficiency.

SUMMARY OF THE INVENTION

In order to thoroughly remove the virus and improve the efficiency of searching and removing the viruses, a scanning method and device, and a client apparatus are provided by embodiments of the invention. Solutions of the invention are described below.

A scanning method, the method includes:

when a specified scanning is started, enumerating at least one disk file in an area corresponding to the specified scanning;

determining a file scanning queue, according to the at least one disk file and at least one suspicious file obtained in a real-time protection process; and scanning the determined file scanning queue according to a virus scanning engine.

the determining a file scanning queue according to the at least one disk file and at least one suspicious file obtained in a real-time protection process includes:

determining, according to file information of the at least one suspicious file, whether the file information of the at least one suspicious file contains a file name of any one of the at least one disk file; and if the file information of the at least one suspicious file contains a file name of any one of the at least one disk file, loading the at least one disk file as well as a suspicious file of which the file information contains the file name of said any one of the at least one disk file into the file scanning queue;

otherwise, loading the at least one disk file into the file scanning queue.

the loading the at least one disk file as well as a suspicious file of which the file information contains the file name of said any one of the at least one disk file into the file scanning queue includes:

obtaining a file involved in a file activity of the suspicious file of which the file information contains the file name of said any one of the at least one disk file, and loading the at least one disk file, the suspicious file of which file information contains the file name of said any one of the at least one disk file, as well as the file involved in the file activity of the suspicious file, into the file scanning queue.

before the determining a file scanning queue, according to the at least one disk file and at least one suspicious file obtained in a real-time protection process, the method further includes:

obtaining the suspicious file in a real-time protection process, and saving the file information of the suspicious file to a specified area, with the file information including at least the file activity of the suspicious file.

after the obtaining the suspicious file in a real-time protection process and saving the file information of the suspicious file to a specified area, with the file information including at least the file activity of the suspicious file, the method further includes:

uploading the file information of the suspicious file to a server, so that the server analyzes the file information of the suspicious file.

after the uploading the file information of the suspicious file to the server, the method further includes:

removing the file information of the suspicious file from the specified area, under the determination that the file information of the suspicious file is successfully unloaded.

after the uploading the file information of the suspicious file to the server, the method further includes:

compressing the file information of the suspicious file, under the determination that the file information of the suspicious file is unsuccessfully unloaded.

A scanning device, including:

an enumeration module, which is configured for enumerating at least one disk file in an area corresponding to the specified scanning when a specified scanning is started;

a queue determination module, which is configured for determining, according to the at least one disk file and at least one suspicious file obtained in a real-time protection process, a file scanning queue; and a scanning module, which is configured for scanning the determined file scanning queue according to a virus scanning engine.

the queue determination module includes:

a determination unit, which is configured for determining, according to file information of the at least one suspicious file, whether the file information of the at least one suspicious file contains a file name of any one of the at least one disk file; and a loading unit, which is configured for loading the at least one disk file as well as a suspicious file of which the file information contains the file name of said any one of the at least one disk file into the file scanning queue, under the determination that the file information of the at least one suspicious file contains the file name of said any one of the at least one disk file;

where, the loading unit is further configured for loading the at least one disk file into the file scanning queue, under the determination that the file information of the at least one suspicious file does not contain the file name of any one of the at least one disk file.

the loading unit is further configured for obtaining a file involved in a file activity of the suspicious file of which the file information contains the file name of said any one of the at least one disk file, and loading the at least one disk file, the suspicious file of which file information contains the file name of said any one of the at least one disk file, as well as the file involved in the file activity of the suspicious file, into the file scanning queue.

the device further includes:

a obtaining module, which is configured for obtaining the suspicious file in a real-time protection process, and saving the file information of the suspicious file to a specified area, with the file information including at least the file activity of the suspicious file.

the device further includes:

a uploading module, which is configured for uploading the file information of the suspicious file to a server, so that the server analyzes the file information of the suspicious file.

the device further includes:

a first processing module, which is configured for removing the file information of the suspicious file from the specified area under the determination that the file information of the suspicious file is successfully uploaded.

the device further includes:

a second processing module, which is configured for compressing the file information of the suspicious file under the determination that the file information of the suspicious file is unsuccessfully uploaded.

a client apparatus, comprising:

one or more processors, and a memory, where, the memory contains one or more programs which are configured to be performed by the one or more processors, and the one or more programs contains instructions for performing operations of:

when a specified scanning is started, enumerating at least one disk file in an area corresponding to the specified scanning;

determining a file scanning queue, according to the at least one disk file and at least one suspicious file obtained in a real-time protection process; and scanning the determined file scanning queue according to a virus scanning engine.

The one or more programs contains instructions for performing operations of:

determining, according to file information of the at least one suspicious file, whether the file information of the at least one suspicious file contains a file name of any one of the at least one disk file; and if the file information of the at least one suspicious file contains a file name of any one of the at least one disk file, loading the at least one disk file as well as the suspicious file of which the file information contains the file name of said any one of the at least one disk file into the file scanning queue;

otherwise, loading the at least one disk file into the file scanning queue.

The one or more programs contains instructions for performing operations of:

obtaining a file involved in a file activity of the suspicious file of which the file information contains the file name of said any one of the at least one disk file, and loading the at least one disk file, the suspicious file of which file information contains the file name of said any one of the at least one disk file, and the file involved in the file activity of the suspicious file, into the file scanning queue.

The one or more programs contains instructions for performing an operation of:

obtaining the suspicious file in the real-time protection process, and saving the file information of the suspicious file to a specified area, with the file information including at least the file activity of the suspicious file.

The one or more programs contains instructions for performing an operation of:

uploading the file information of the suspicious file to a server, so that the server analyzes the file information of the suspicious file.

preferably, the one or more programs contains instructions for performing an operation of:

removing the file information of the suspicious file from the specified area, under the determination that the file information of the suspicious file is successfully uploaded.

The one or more programs contains instructions for performing an operation of:

compressing the file information of the suspicious file, under the determination that the file information of the suspicious file is unsuccessfully uploaded.

The solutions provided in embodiments of the invention bring about beneficial effects as follows.

when a specified scanning is started, enumerating at least one disk file in an area corresponding to the specified scanning; determining, according to the at least one disk file and at least one suspicious file obtained in a real-time protection process, a file scanning queue; and scanning the determined file scanning queue according to a virus scanning engine. The embodiments of the present invention can combine the real-time protection process with the file scanning process to avoid the problem that the scanning for the suspicious file obtained from the real-time protection process is omitted due to limitation in the range of the scanned area caused by the specified scanning, so that the case where the viruses fail to be thoroughly removed due to the limitation of the specified scanning can be effectively avoided. Furthermore, in the embodiment of the present invention, the file scanning queue is redetermined according to the suspicious file obtained in advance from the real-time protection process, so that the possible threats are scanned throughout, thus thoroughly removing the threats. The files can be thoroughly scanned, thus improving the capability of removing the threats and the efficiency of searching and removing the viruses, as compared with the prior art.

BRIEF DESCRIPTION OF THE DRAWINGS

Accompanying drawings used for the description of embodiments of the invention are briefly introduced below in order to enable the technical solutions in the embodiments more clearly. Apparently, the drawings in the following description are merely some embodiments of the invention, and other drawings can be obtained according to the drawings by those skilled in the art without any creative work.

DETAILED DESCRIPTION

In order to enable objects, solutions and advantages of the invention more clearly, embodiments of the invention are further described in detail below in conjunction with the accompanying drawings.

Figure 1:
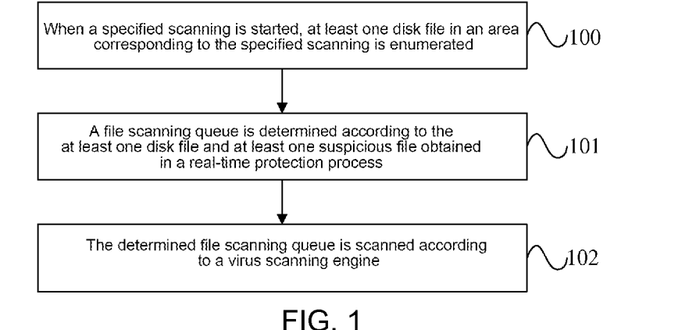
FIG. 1 is flowchart of a scanning method according to an embodiment of the invention.

FIG. 1 is flowchart of a scanning method according to an embodiment of the invention. As shown in FIG. 1, a client apparatus, which may be a computer, is the main body for executing the scanning method of the present embodiment. The scanning method of the present embodiment can specifically include the following Steps 100 to 102.

At Step 100, when a specified scanning is started, at least one disk file in an area corresponding to the specified scanning is enumerated.

In the present embodiment, the specified scanning generally refers to a partial scanning rather than a full scanning for the apparatus, and the specified scanning can include a security task scanning or a file scanning.

The security task scanning refers to a scanning for a memory and/or a key disk, where a scanned area of the security task scanning includes the memory and/or the key disk, and a scanned object of the security task scanning includes the disk file in the memory and/or the key disk. For example, if the key disk includes a C disk, then the scanned area of the security task scanning includes the memory and the C disk, and the scanned object of the security task scanning includes the disk file in the memory and the C disk.

The file scanning refers to a scanning for the specified disk position and the file in the specified disk. A scanned area of the file scanning includes the specified disk and/or the specified disk position, and a scanned object of the file scanning includes the disk file in the specified disk and/or the specified disk position. For example, if the specified disk includes a D disk, then the scanned area of the file scanning includes the D disk, and the scanned object of the file scanning includes the disk file in the D disk.

In practical, the scanned area of the security task scanning can be set by skilled persons and then adjusted in use by users, and the scanned area of the file scanning can also be set similarly, which is not limited by the embodiment of the present invention.

It is noted that the "at least one" described in the present embodiment refers to one or more than one.

At Step 101, a file scanning queue is determined according to the at least one disk file and at least one suspicious file obtained in a real-time protection process.

Specifically, since the scanned area is limited by the specified scanning as the specified scanning is started, the suspicious file obtained in a real-time protection process may be omitted if it is not located at the scanned area of the specified scanning, thereby causing security risks. Therefore, it is necessary for redetermining the file scanning queue in combination with the at least one suspicious file obtained from the real-time protection process based on the enumerated at least one disk file, so as to ensure the scanning efficiency.

At Step 102, the determined file scanning queue is scanned according to a virus scanning engine.

In the present embodiment, the virus scanning engine can be a local engine, or a cloud virus scanning engine, for comparing files in the file scanning queue one after another when scanning the files, to search and remove the file of which the characteristic conforms to that of the viruses in the virus scanning engine.

In summary, with the scanning method according to the present embodiment, when a specified scanning is started, at least one disk file in an area corresponding to the specified scanning is enumerated; a file scanning queue is determined according to the at least one disk file and at least one suspicious file obtained in a real-time protection process; and the determined file scanning queue is scanned according to a virus scanning engine. In the embodiment of the present invention, the real-time protection process can combined with the file scanning process by employing the above technical solution, thus avoiding the problem that the scanning for the suspicious file obtained from the real-time protection process is omitted due to limitation in the range of the scanned area caused by the specified scanning, so that the case where the viruses fail to be thoroughly removed due to the limitation of the specified scanning can be effectively avoided. Furthermore, in the embodiment of the present invention, the file scanning queue is redetermined according to the suspicious file obtained in advance from the real-time protection process, so that the possible threats are scanned throughout, thus thoroughly removing the threats. With scanning method according to the present embodiment, the files can be thoroughly scanned, thus improving the capability of removing the threats and the efficiency of searching and removing the viruses, as compared with the prior art.

Optionally, on the basis of the technical solution of the embodiment shown in the above FIG. 1, the Step 101 in which a file scanning queue is determined according to the at least one disk file and at least one suspicious file obtained in a real-time protection process specifically includes Step (1) to Step (3):

In step (1), it is determined according to file information of the at least one suspicious file whether the file information of the at least one suspicious file contains a file name of any one of the at least one disk file.

In the present embodiment, the file information of the suspicious file at least includes a file activity of the suspicious file, which refers to execution, loading, generation or modification, etc., of the suspicious file. The containing of the file information of the suspicious file within the file name of the disk file indicates that the disk file is associated with the file activity of the suspicious file. In an embodiment, if the relationship between the suspicious file and the disk file is determined as a relationship of a maternal file versus a sub-file, then maternal file information or sub-file information in the file activity of the suspicious file contains the file name of the disk file. For example, assuming that the file information of the suspicious file 'B' contains a file name of a loaded file 'B-plus', the disk file 'B-plus' of the at least one disk file is loaded when the file activity of the suspicious file 'B' is conducted, and in this case, the suspicious file 'B' is associated with the disk file 'B-plus'. Similarly, for example, assuming that the suspicious file is 'C-plus' and source information in the file information of the suspicious file 'C-plus' contains a disk file 'C', the suspicious file 'C-plus' is loaded when the file activity of the disk file 'C' is conducted, and in this case, the suspicious file 'C-plus' is associated with the disk file 'C'. Similarly, for example, assuming that the suspicious file is 'A' and sub-file information in the file information of the suspicious file 'A' contains a disk file 'A-1', the suspicious file 'A' is a maternal file of the disk file 'A-1', and in this case, the suspicious file 'A' is associated with the disk file 'A-1' of the at least one disk file.

It is noted that the file information of the suspicious file can be obtained in a real-time protection process and saved into the specified area in order to be read in subsequent scanning processes.

In step (2), when the file information of the at least one suspicious file contains the file name of any one of the at least one disk file, the at least one disk file as well as a suspicious file of which the file information contains the file name of said any one of the at least one disk file are loaded into the file scanning queue.

As it is determined that the file information of the at least one suspicious file contains the file name of any one of the at least one disk file, it is determined that the at least one suspicious file includes the suspicious file associated with any one of the at least one disk file. To ensure the efficiency of searching and removing the viruses, the at least one disk file as well as the suspicious file of which the file information contains the file name of any one of the at least one disk file are loaded into the file scanning queue.

Such suspicious file of which the file information contains the file name of any one of the at least one disk file may be one or more, which is not limited by the embodiment of the invention.

In Step (3), when the file information of the at least one suspicious file does not contain the file name of any one of the at least one disk file, the at least one disk file is loaded into the file scanning queue.

It is noted that the method of loading files into the file scanning queue in the embodiment of the present invention can make reference to the prior art in detail, which is not repeatedly discussed again.

Optionally, on the basis of the above technical solution of the embodiment shown in FIG. 1, Step (2) in Step 101 in which "the at least one disk file as well as the suspicious file of which the file information contains the file name of any one of the at least one disk file are loaded into the file scanning queue" specifically includes: obtaining a file involved in a file activity of the suspicious file of which the file information contains the file name of any one of the at least one disk file, and loading the at least one disk file, the suspicious file of which the file information contains the file name of any one of the at least one disk file as well as the file involved in the file activity of the suspicious file, into the file scanning queue.

In the present embodiment, for the suspicious file of which the file information contains the file name of any one of the at least one disk file, the file activity thereof may further involves other files. Therefore, to thoroughly remove the threats, the file involved in the file activity of the suspicious file needs to be loaded into the file scanning queue. For example, assuming that the suspicious file of which the file information contains the file name of any one of the at least one disk file is 'B', and a disk file 'B-plus' of the at least one disk file is loaded while load disk files 'B-1' and 'B-2' in an E disk are also loaded when the file activity of the suspicious file 'B' is conducted, the suspicious file B, the disk files B-1 and B-2 and at least one disk file are then loaded into the file scanning queue in the loading process.

It is noted that the file information of the suspicious file of which the file information contains the file name of any one of the at least one disk file can be obtained in a real-time protection process and saved into the specified area in order to be read in subsequent scanning processes.

In addition, the file information of the suspicious file can further includes a file source, a sub-file name and a maternal file information name, etc, of the suspicious file. Therefore, it can be further determined whether the at least one suspicious file includes the sub-file or maternal file of any one of the at least one disk file according to the determination of Step (1) of the Step 101. Specifically, if any of the file source, the sub-file name and the maternal file information in the file information of the suspicious file includes the file name of any one of the at least one disk file, then the file source or the maternal file of the suspicious file is the disk file, or the suspicious file is the file source of the disk file or the maternal file of the disk file, etc., and thus it is determined that the at least one suspicious file includes the sub-file or maternal file of any one of the at least one disk file.

It is noted that the file information of the suspicious file can be issued by a server and saved into the specified area. Optionally, on the basis of the technical solution of the above embodiment, before Step 101 in which "a file scanning queue is determined according to the at least one disk file and at least one suspicious file obtained in a real-time protection process", the method can further include Step (a) to Step (c)

In Step (a), the suspicious file is obtained in the real-time protection process, and the file information thereof is saved to the specified area, with the file information containing at least the file activity of the suspicious file.

Specifically, the real-time protection is started; the file activity of the disk file is detected; and when the suspicious file is obtained according to the file activity of the disk file, it is determined whether the suspicious file has been recorded; if so, it is ended; otherwise, said suspicious file is recorded in a set of suspicious files, and the file information of said suspicious file is saved to the specified area. The method of determining whether the suspicious file has been recorded can be implemented with a number of manners in the prior art, which is not discussed herein in detail.

In the present embodiment, the specified area refers to an area for saving the file information of the suspicious file obtained and saved in the real-time protection process, which is divided out on the disk. A position and a capacity of the specified area can be set or adjusted by skilled persons or users, which is not limited by the embodiment of the invention. The file activity of the suspicious file includes, but not limited to, any one of the following file activities: (1) releasing of a sub-file, accordingly, the file information includes at least one of a sub-file name, a sub-file storage path, a sub-file modification time and a sub-file creation time; (2) loading of files, accordingly, the file information includes at least one of the loaded file name and the loaded file path; (3) creating and modifying of the suspicious file, accordingly, the file information includes at least one of a modification time, a creation time, a maternal file information and a maternal file path of the suspicious file.

It is noted that the file information which needs to be saved in a real-time protection process can be set or adjusted by updating software by skilled persons, which is not limited by the embodiment of the present invention.

Optionally, on the basis of the technical solution of the above embodiment, after the above Step (a) in which "the suspicious file is obtained in the real-time protection process, and the file information thereof is saved to the specified area, with the file information containing at least the file activity of the suspicious file", the method includes Step (b) in which "the file information of the suspicious file is uploaded to a server so that the server analyzes the file information of the suspicious file".

The server in the present embodiment can be a cloud server. By uploading the file information of the suspicious file to the cloud server, the skilled persons can analyze the file activity of the suspicious file and the virus characteristic of the suspicious file, etc., according to the uploaded file information of the suspicious file, in order to upgrade the virus scanning engine, which is not limited by the present embodiment. Further, when the file information of the suspicious file is uploaded to the server, it may be determined whether the file information of the suspicious file has saved in the server according to each of file characteristic values of the suspicious files; if so, the file information of said suspicious file stops being uploaded to the server; otherwise, the file information of the suspicious file continues being upload to the server. Further, the manner for uploading the file information can be periodical, or can be conducted whenever the real-time protection process ends, or can be conducted after updating the detected file information of the suspicious file, which is limited by the present embodiment.

Optionally, on the basis of the technical solution of the above embodiment, after the above Step (b) in which the file information of the suspicious file is uploaded to a server, the method includes:

Step (c) in which under the determination that the file information of the suspicious file is successfully uploaded, the file information of the suspicious file is removed from the specified area.

To save a disk resource, the file information of the suspicious file is removed from the specified area when it is determined that the file information of the suspicious file is successfully uploaded to the server. It is noted that the determination with regard to whether the file information is successfully uploaded is the prior art, which is not repeatedly discussed again herein.

Optionally, on the basis of the technical solution of the above embodiment, after the above Step (b) in which the file information of the suspicious file is uploaded to a server, the method includes the step of compressing the file information of the suspicious file under the determination that the file information of the suspicious file is unsuccessfully uploaded.

The uploading of the Step (b) may be failed due to reasons such as an abnormal user network, in this case, the file information of suspicious file is compressed in order to keep the file information without waste of disk resources. Further, after the user network recovers normal, the file information of the suspicious file is then uploaded to the server and removed from the disk.

It is noted that all above-mentioned optional technical solutions can be combined with any manner in order to form the optional technical solution of the embodiment of the present invention, which is not repeatedly discussed again herein.

The above embodiment can combine the real-time protection process with the file scanning process by using the above technical solution to avoid the problem that the scanning for the suspicious file obtained from the real-time protection process is omitted due to limitation in the range of the scanned area caused by the specified scanning, so that the case where the viruses fail to be thoroughly removed due to the limitation of sub-file/maternal file and the specified scanning can be effectively avoided. Furthermore, in the embodiment of the present invention, the file scanning queue is redetermined according to the suspicious file obtained in advance from the real-time protection process, so that the possible threats are scanned throughout, thus thoroughly removing the threats. With scanning method according to the present embodiment, the files can be thoroughly scanned, thus improving the capability of removing the threats and the efficiency of searching and removing the viruses, as compared with the prior art.

Figure 2:
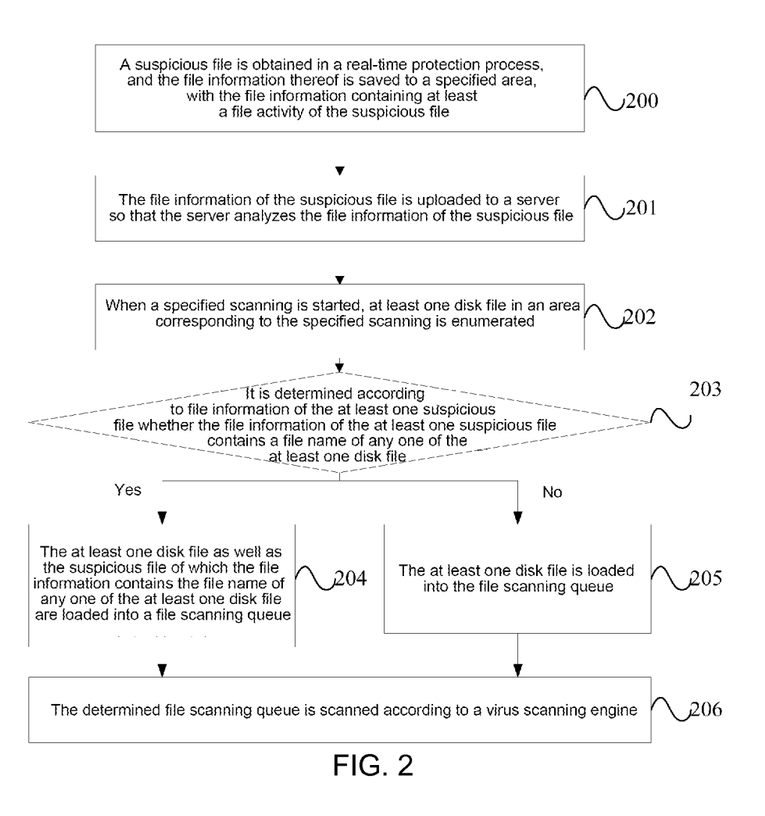
FIG. 2 is flowchart of a scanning method according to an embodiment of the invention.

FIG. 2 is a flowchart of a scanning method according to an embodiment of the invention. The scanning method of the present embodiment includes the all above optional technical solutions, for example, to illustrate the technical solutions of the present invention in more detail. As shown in FIG. 2, the scanning method of the present embodiment can specifically include the following Steps 200 to 206.

At Step 200, a suspicious file is obtained in a real-time protection process, and the file information thereof is saved to a specified area, with the file information containing at least a file activity of the suspicious file; and then Step 201 is performed.

At Step 201, the file information of the suspicious file is uploaded to a server so that the server analyzes the file information of the suspicious file, and then Step 202 is performed.

Further, after the step in which the file information of the suspicious file is uploaded to a server, the method includes:

the file information of the suspicious file is removed from the specified area under the determination that the file information of the suspicious file is successfully uploaded.

Further, after the step in which the file information of the suspicious file is uploaded to a server, the method includes:

the file information of the suspicious file is compressed under the determination that the file information of the suspicious file is unsuccessfully uploaded.

At Step 202, when a specified scanning is started, at least one disk file in an area corresponding to the specified scanning is enumerated, and then Step 203 is performed.

At Step 203, it is determined according to file information of the at least one suspicious file whether the file information of the at least one suspicious file contains a file name of any one of the at least one disk file; if so, Step 204 is performed; otherwise, Step 205 is performed.

At Step 204, the at least one disk file as well as the suspicious file of which the file information contains the file name of any one of the at least one disk file are loaded into a file scanning queue, and then Step 206 is performed.

At Step 205, the at least one disk file is loaded into the file scanning queue, and then Step 206 is performed.

At Step 206, the determined file scanning queue is scanned according to a virus scanning engine.

The embodiment of the present invention can combine the real-time protection process with the file scanning process by using the above technical solution to avoid the problem that the scanning for the suspicious file obtained from the real-time protection process is omitted due to limitation in the range of the scanned area caused by the specified scanning, so that the case where the viruses fail to be thoroughly removed due to the limitation of sub-file/maternal file and the specified scanning can be effectively avoided. Furthermore, in the embodiment of the present invention, the file scanning queue is redetermined according to the suspicious file obtained in advance from the real-time protection process, so that the possible threats are scanned throughout, thus thoroughly removing the threats. With scanning method according to the present embodiment, the files can be thoroughly scanned, thus improving the capability of removing the threats and the efficiency of searching and removing the viruses, as compared with the prior art.

Figure 3:
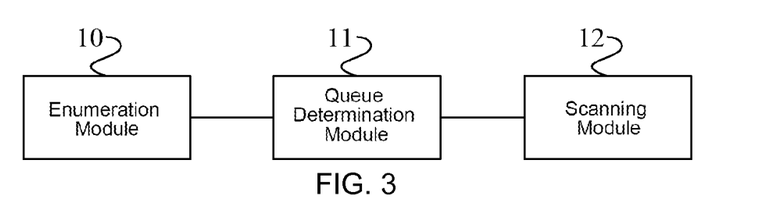
FIG. 3 is a schematic diagram showing the structure of a scanning device according to an embodiment of the invention.

FIG. 3 is a schematic diagram showing the structure of a scanning device according to an embodiment of the invention. As shown in FIG. 3, the scanning device can specifically include an enumeration module 10, a queue determination module 11 and a scanning module 12.

The enumeration module 10 is configured for enumerating at least one disk file in an area corresponding to the specified scanning when a specified scanning is started. The queue determination module 11, which is connected with the enumeration module 10, is configured for determining a file scanning queue, according to the at least one disk file as well as at least one suspicious file obtained in a real-time protection process. The scanning module 12, which is connected with the queue determination module 11, is configured for scanning the file scanning queue determined by the queue determination module 11, according to a virus scanning engine.

The mechanism for scanning the files by employing the above modules in the scanning device of the present embodiment is the same as that in the embodiments of the above related methods, and can refer to the description of the embodiments of the above related methods in detail, which is not repeatedly discussed again herein.

The above embodiment can combine the real-time protection process with the file scanning process by using the above technical solution to avoid the problem that the scanning for the suspicious file obtained from the real-time protection process is omitted due to limitation in the range of the scanned area caused by the specified scanning, so that the case where the viruses fail to be thoroughly removed due to the limitation of sub-file/maternal file and the specified scanning can be effectively avoided. Furthermore, in the embodiment of the present invention, the file scanning queue is redetermined according to the suspicious file obtained in advance from the real-time protection process, so that the possible threats are scanned throughout, thus thoroughly removing the threats. With scanning method according to the present embodiment, the files can be thoroughly scanned, thus improving the capability of removing the threats and the efficiency of searching and removing the viruses, as compared with the prior art.

The scanning device of the present embodiment can further include the following technical solution on the basis of the embodiment shown in the FIG. 3. The queue determination module 11 includes a determination unit and a loading unit (not shown) connected with the determination unit. The determination unit is configured for determining, according to file information of the at least one suspicious file, whether the file information of the at least one suspicious file contains a file name of any one of the at least one disk file. The loading unit is configured for loading the at least one disk file as well as the suspicious file of which the file information contains the file name of any one of the at least one disk file into the file scanning queue under the determination that the file information of the at least one suspicious file contains the file name of any one of the at least one disk file. The loading unit is further configured for loading the at least one disk file into the file scanning queue under the determination that the file information of the at least one suspicious file does not contain the file name of any one of the at least one disk file.

Further, the loading unit is further configured for obtaining a file involved in a file activity of the suspicious file of which the file information contains the file name of any one of the at least one disk file, and loading the at least one disk file, the suspicious file of which the file information contains the file name of any one of the at least one disk file, and the file involved in the file activity of the suspicious file, into the file scanning queue.

Figure 4:
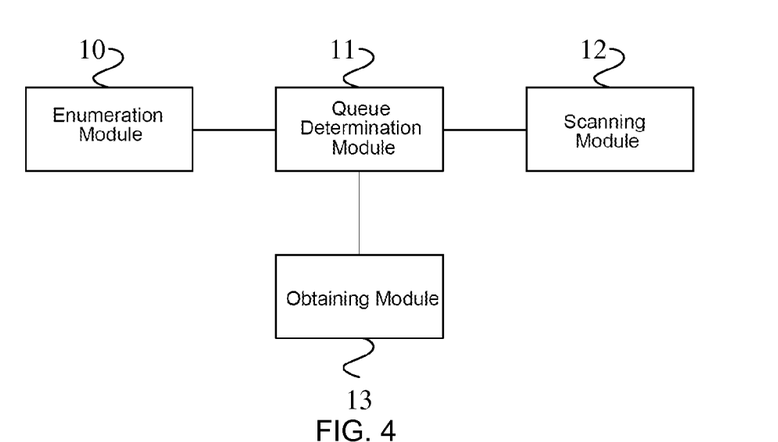
FIG. 4 is a schematic diagram showing the structure of a scanning device according to an embodiment of the invention.

FIG. 4 is a schematic diagram showing the structure of a scanning device according to an embodiment of the invention. As shown in FIG. 4, the scanning device of the present embodiment can further include the following technical solution on the basis of the embodiment shown in FIG. 3.

As shown in FIG. 4, the scanning device of the present embodiment further includes an obtaining module 13 which is connected with the queue determination module 11. The obtaining module 13 is configured for obtaining the suspicious file in a real-time protection process and saving the file information of the suspicious file to the specified area, with the file information containing at least the file activity of the suspicious file.

Figure 5:
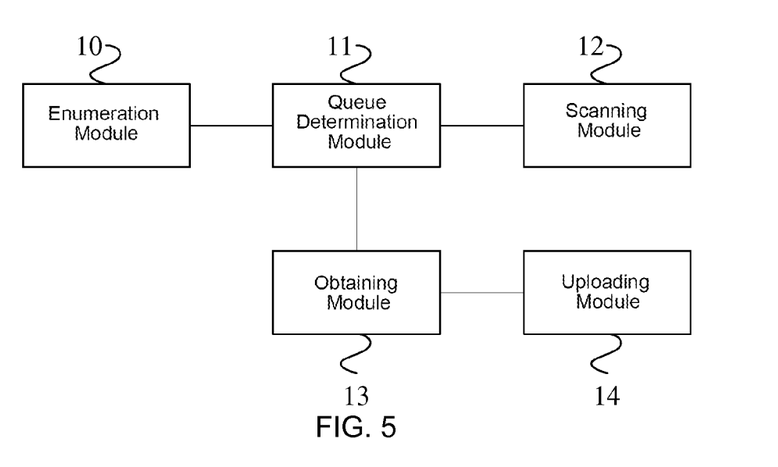
FIG. 5 is a schematic diagram showing the structure of a scanning device according to an embodiment of the invention.

FIG. 5 is a schematic diagram showing the structure of a scanning device according to an embodiment of the invention. As shown in FIG. 5, the scanning device of the present embodiment can further include the following technical solution on the basis of the embodiment shown in FIG. 4.

As shown in FIG. 5, the scanning device of the present embodiment further includes an uploading module 14 which is connected with the obtaining module 13. The uploading module 14 is configured for uploading the file information of the suspicious file to a server so that the server analyzes the file information of the suspicious file.

Optionally, the scanning device of the present embodiment further includes a first processing module (not shown) configured for removing the file information of the suspicious file from the specified area under the determination that the file information of the suspicious file is successfully uploaded.

Optionally, the scanning device of the present embodiment further includes a second processing module (not shown) which is configured for compressing the file information of the suspicious file under the determination that the file information of the suspicious file is unsuccessfully uploaded.

The mechanism for scanning the files by employing the above modules in the scanning device of the present embodiment is the same as that in the embodiments of the above related methods, and can refer to the description of the embodiments of the above related methods in detail, which is not repeatedly discussed again herein.

The scanning device of the present embodiment can combine the real-time protection process with the file scanning process by using the above technical solution to avoid the problem that the scanning for the suspicious file obtained from the real-time protection process is omitted due to limitation in the range of the scanned area caused by the specified scanning, so that the case where the viruses fail to be thoroughly removed due to the limitation of sub-file/maternal file and the specified scanning can be effectively avoided. Furthermore, in the embodiment of the present invention, the file scanning queue is redetermined according to the suspicious file obtained in advance from the real-time protection process, so that the possible threats are scanned throughout, thus thoroughly removing the threats. With scanning method according to the present embodiment, the files can be thoroughly scanned, thus improving the capability of removing the threats and the efficiency of searching and removing the viruses, as compared with the prior art.

It is noted that in the above embodiment, the scanning device during scanning is illustrated, for example, merely by way of distinction of each of the function modules, but in a practical application, the above functions can be allocated as desired in order to be implemented by different function modules, that is, the internal structure of the device is divided into different function modules to implement the all or some of the functions described above. In addition, the scanning device provided by the above embodiment has the same conception as and can refer to the scanning method of the embodiments, which is not repeatedly discussed again herein.

The above scanning device can be used for any one of the client apparatuses with a function of removing viruses, which include, but not limited to, personal computers.

Figure 6:
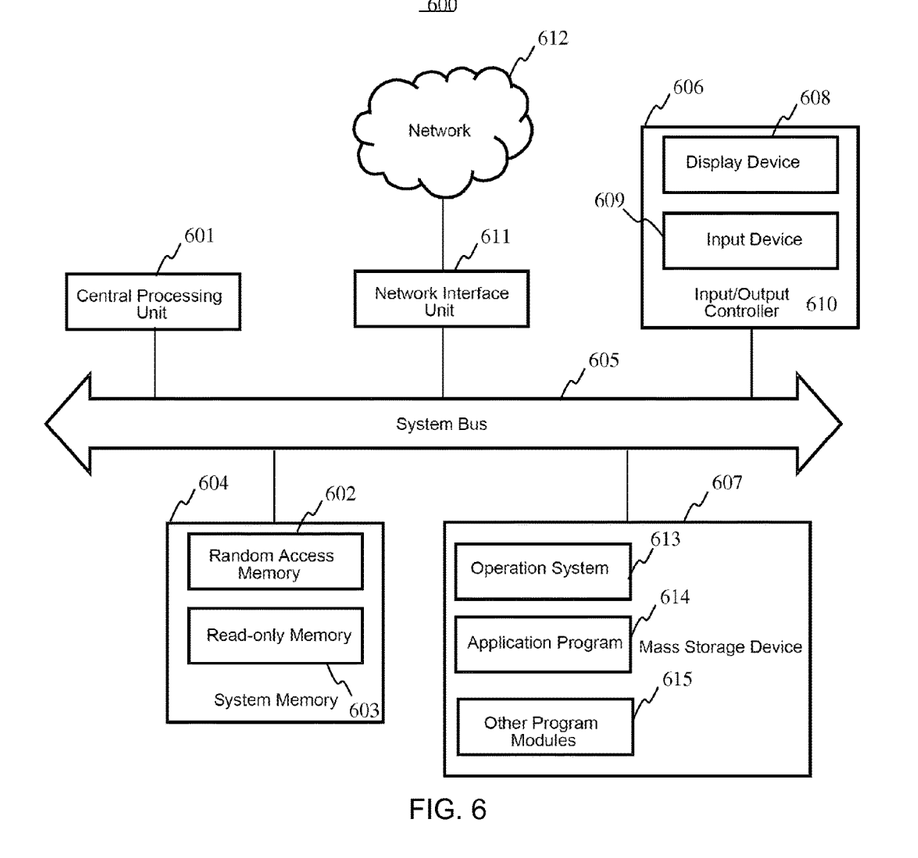
FIG. 6 is a schematic diagram showing the structure of a client apparatus according to an embodiment of the invention.

FIG. 6 is a schematic diagram showing the structure a client apparatus according to an embodiment of the invention. The client apparatus 600, which can be a conventional desk computer or a laptop, may include a central processing unit (CPU) 601, a system memory 604 including a random access memory (RAM) 602 and a read-only memory (ROM) 603, and a system bus 605 which is connected with the system memory 604 and the central processing unit 601. The client apparatus 600 further includes a basic input/output system (I/O system) 606 which is configured for facilitating an information transmission between components of the computer, and a mass storage device 607 which is configured for storing an operation system 613, an application program 614 and other program modules 615.

The basic input/output system 606 includes a display device 608 for displaying information and an input device 609 (such as a mouse or a keyboard) for inputting information by a user. Both the display device 608 and the input device 609 can be connected to the central processing unit 601 via an input/output controller 610 connected with the system bus 605. The input/output controller 610, which is also contained in the basic input/output system 606, is configured for receiving and processing an input from other devices such as a keyboard, a mouse, or an electronic stylus. Similarly, the input/output controller 610 can further provide an output to the output device such as a display screen, a printer, or others.

The mass storage device 607 is connected to the central processing unit 601 via a mass storage controller (not shown) connected with the system bus 605. The mass storage device 607 and its associated computer readable storage medium can provide a nonvolatile storage for the client apparatus 600. That is, the mass storage device 607 can include a computer readable medium (not shown) such as a hard disk or a CD-ROM drive.

In general, the computer readable medium can include a computer storage medium and a communication medium. The computer storage medium includes volatile and nonvolatile, removable and immovable mediums implemented in any methods or technologies for storing information such as computer readable instructions, data structures, program modules or other data. The computer storage medium may include a RAM, a ROM, an EPROM, an EEPROM, a flash memory and other solid state memories, a CD-ROM, a DVD or other optical storages, a cassette, a tape, a disk storage, or other magnetic storage devices. Of course, it can be known by those skilled in the art that the computer storage medium is not limited thereto. The above system memory 604 and the mass storage device 607 can be referred to as a memory.

According to various embodiments of the present invention, the client apparatus 600 can further be operated by connecting to a remote computer which is connected to a network such as through the Internet. That is, the client apparatus 600 can be connected to a network 612 via a network interface unit 611 connected with the system bus 605, or can also be connected to other types of network or remote computer system (not shown) by using the network interface unit 611.

The memory can further include one or more programs stored therein, and is configured such that the one or more programs is performed by one or more central processing unit 601 to perform the scanning methods provided in the embodiments shown in FIG. 1 and FIG. 2.

It would be appreciated by those ordinary skilled in the art that all or some of the steps in the above embodiments can be implemented by hardware, or by instructing the related hardware by programs. The programs may be stored in a computer readable storage medium which can be a read-only memory, a magnetic disc or a compact disk, etc. The computer readable storage medium stores one or more programs, which is/are performed by one or more processors to perform the scanning methods provided in the embodiments shown in FIG. 1 and FIG. 2.

The embodiments of the invention have been described as above, but are not intended to limit the invention. Any change, substitution, and modification, etc., made within the spirit and principle of the invention should fall into the protection scope of the invention.

The invention claimed is:

1. A scanning method, comprising:
   obtaining at least one suspicious file in a real-time protection process and saving file information of the at least one suspicious file to a specified area, wherein the file information comprises a file activity of the at least one suspicious file;
   when a specified scanning is started after the file information of the at least one suspicious file is saved to the specified area, enumerating at least one disk file in an area corresponding to the specified scanning;
   determining a file scanning queue, according to the at least one disk file and the at least one suspicious file obtained in the real-time protection process; and
   scanning the determined file scanning queue according to a virus scanning engine;
   wherein the determining a file scanning queue according to the at least one disk file and the at least one suspicious file obtained in a real-time protection process comprises:
      determining, according to file information of the at least one suspicious file, whether the file information of the at least one suspicious file contains a file name of any one of the at least one disk file; and
      if the file information of the at least one suspicious file contains the file name of any one of the at least one disk file, obtaining a second file involved in the file activity of a first suspicious file whose file information contains the file name of any one of the at least one disk file, and loading the at least one disk file, the first suspicious file, as well as the second file involved in the file activity of the first suspicious file, into the file scanning queue; otherwise, loading the at least one disk file into the file scanning queue, wherein the second file loaded into the file scanning queue is not located in the area corresponding to the specified scanning.

2. The method of claim 1, wherein, after the obtaining the suspicious file in a real-time protection process and saving the file information of the suspicious file to a specified area, with the file information comprising at least the file activity of the suspicious file, the method further comprises:
   uploading the file information of the suspicious file to a server, so that the server analyzes the file information of the suspicious file.

3. The method of claim 2, wherein, after the uploading the file information of the suspicious file to the server, the method further comprises:
   removing the file information of the suspicious file from the specified area, under the determination that the file information of the suspicious file is successfully uploaded.

4. The method of claim 2, wherein, after the uploading the file information of the suspicious file to the server, the method further comprises:
   compressing the file information of the suspicious file, under the determination that the file information of the suspicious file is unsuccessfully uploaded.

5. The method of claim 1, further comprising:
   if the file information of the at least one suspicious file includes a third suspicious file which is not included in any one of the at least one disk file identified by the specified scanning, adding the third suspicious file to the file scanning queue.

6. The method of claim 1, wherein the real-time protection process and a scanning process performed by the virus scanning engine are independent from each other.

7. The method of claim 1, wherein the first suspicious file is not located in the area corresponding to the specified scanning.

8. The method of claim 7, wherein,
   the file information of the first suspicious file contains a file name of a first disk file; and
   the first disk file is a sub-file or a parent file of the first suspicious file.

9. The method of claim 1, further comprising:
   reading, by the virus scanning engine, the specified area to obtain the file information of the first suspicious file identified by the real-time protection process.

10. The method of claim 1, wherein:
    the file activity of the at least one suspicious file includes at least one of: releasing of a sub-file, loading of files, or creating and modifying of the at least one suspicious file.

11. A scanning device, comprising:
    a computer readable storage medium;
    at least one processor operatively associated with the storage medium; a plurality of program modules stored in the computer readable storage and configured to be executed by the at least one processor, wherein the plurality of program modules comprises:
    an obtaining module, which is configured for obtaining at least one suspicious file in a real-time protection process and saving file information of the at least one suspicious file to a specified area, wherein the file information comprises a file activity of the at least one suspicious file;
    an enumeration module, which is configured for enumerating, when a specified scanning is started after the file information of the at least one suspicious file is saved to the specified area, at least one disk file in an area corresponding to the specified scanning;
    a queue determination module, which is configured for determining a file scanning queue, according to the at least one disk file and the at least one suspicious file obtained in the real-time protection process; and
    a scanning module, which is configured for scanning the determined file scanning queue according to a virus scanning engine;
    wherein, the queue determination module comprises:
    a determination unit, which is configured for determining, according to file information of the at least one suspicious file, whether the file information of the at least one suspicious file contains a file name of any one of the at least one disk file; and
    a loading unit, which is configured for obtaining a second file involved in the file activity of a first suspicious file whose file information contains the file name of any one of the at least one disk file, and loading the at least one disk file, the first suspicious file, as well as the second file involved in the file activity of the first suspicious file, into the file scanning queue, under the determination that the file information of the at least one suspicious file contains the file name of said any one of the at least one disk file, wherein the second file loaded into the file scanning queue is not located in the area corresponding to the specified scanning;
    wherein the loading unit is further configured for loading the at least one disk file into the file scanning queue, under the determination that the file information of the at least one suspicious file does not contain the file name of any one of the at least one disk file.

12. The device of claim 11, wherein, the plurality of program modules further comprises:

an uploading module, which is configured for uploading the file information of the suspicious file to a server, so that the server analyzes the file information of the suspicious file.

13. The device of claim 12, wherein, the plurality of program modules further comprises:

a first processing module, which is configured for removing the file information of the suspicious file from the specified area under the determination that the file information of the suspicious file is successfully uploaded.

14. The device of claim 13, wherein, the plurality of program modules further comprises:

a second processing module, which is configured for compressing the file information of the suspicious file under the determination that the file information of the suspicious file is unsuccessfully uploaded.

15. A client apparatus, comprising:

one or more processors, and a memory;

wherein the memory contains one or more programs which are configured to be performed by the one or more processors, and the one or more programs contains instructions for performing operations of:

obtaining at least one suspicious file in a real-time protection process and saving file information of the at least one suspicious file to a specified area, wherein the file information comprises a file activity of the at least one suspicious file;

when a specified scanning is started after the file information of the at least one suspicious file is saved to the specified area, enumerating at least one disk file in an area corresponding to the specified scanning;

determining a file scanning queue, according to the at least one disk file and the at least one suspicious file obtained in a real-time protection process; and scanning the determined file scanning queue according to a virus scanning engine;

wherein the one or more programs further comprising instructions for performing operations of:

determining, according to file information of the at least one suspicious file, whether the file information of the at least one suspicious file contains a file name of any one of the at least one disk file; and if the file information of the at least one suspicious file contains the file name of any one of the at least one disk file, obtaining a second file involved in the file activity of a first suspicious file whose file information contains the file name of any one of the at least one disk file, and loading the at least one disk file, the first suspicious file, as well as the second file involved in the file activity of the first suspicious file, into the file scanning queue; otherwise, loading the at least one disk file into the file scanning queue, wherein the second file loaded into the file scanning queue is not located in the area corresponding to the specified scanning.

16. The client apparatus of claim 15, further comprising instructions for performing an operation of:

uploading the file information of the suspicious file to a server, so that the server analyzes the file information of the suspicious file.

17. The client apparatus of claim 16, further comprising instructions for performing an operation of:

removing the file information of the suspicious file from the specified area, under the determination that the file information of the suspicious file is successfully uploaded;

or compressing the file information of the suspicious file, under the determination that the file information of the suspicious file is unsuccessfully uploaded.

* * * * *